(12) United States Patent
Yahagi

(10) Patent No.: US 7,065,360 B2
(45) Date of Patent: Jun. 20, 2006

(54) MULTI-NETWORK COMMUNICATIONS SYSTEM

(75) Inventor: Masahiko Yahagi, Tokyo (JP)

(73) Assignee: NEC Corporation, Tokyo (JP)

( * ) Notice: Subject to any disclaimer, the term of this patent is extended or adjusted under 35 U.S.C. 154(b) by 359 days.

(21) Appl. No.: 10/058,960

(22) Filed: Jan. 30, 2002

(65) Prior Publication Data

US 2002/0102978 A1 Aug. 1, 2002

(30) Foreign Application Priority Data

Jan. 31, 2001 (JP) .............................. 2001-023818

(51) Int. Cl.
H04Q 7/20 (2006.01)
H04Q 7/00 (2006.01)

(52) U.S. Cl. .................. 455/437; 455/436; 455/442; 455/453; 455/432.1; 455/435.2; 455/422.1; 455/425; 370/331; 370/332

(58) Field of Classification Search ............. 455/432.1, 455/435.2, 436, 437, 442, 453, 422.1, 425; 370/331, 332
See application file for complete search history.

(56) References Cited

U.S. PATENT DOCUMENTS

| | | | | |
|---|---|---|---|---|
| 4,435,840 A | * | 3/1984 | Kojima et al. ............... 455/524 |
| 5,212,806 A | * | 5/1993 | Natarajan ..................... 455/525 |
| 5,363,427 A | * | 11/1994 | Ekstrom et al. .......... 455/426.1 |
| 5,504,803 A | * | 4/1996 | Yamada et al. ........... 455/426.1 |
| 5,915,214 A | | 6/1999 | Reece et al. |
| 5,983,092 A | * | 11/1999 | Whinnett et al. ............ 455/406 |
| 5,995,829 A | * | 11/1999 | Broderick .................... 455/418 |
| 6,094,674 A | | 7/2000 | Hattori et al. |
| 6,101,379 A | * | 8/2000 | Rahman et al. .............. 455/406 |
| 6,119,003 A | * | 9/2000 | Kukkohovi ............... 455/435.2 |
| 6,128,489 A | * | 10/2000 | Seazholtz et al. ......... 455/432.1 |
| 6,167,250 A | | 12/2000 | Rahman et al. |
| 6,188,902 B1 | * | 2/2001 | Yamada ...................... 455/445 |
| 6,400,946 B1 | * | 6/2002 | Vazvan et al. ............ 455/432.1 |
| 6,456,858 B1 | * | 9/2002 | Streter ...................... 455/552.1 |

(Continued)

FOREIGN PATENT DOCUMENTS

EP 0 724 371 A1 7/1996

(Continued)

OTHER PUBLICATIONS

C. Tamvaclis, "QOS Driven Routing in Packet Switched Networks of Multiple Transmission Media", Agard Conference Proceedings, Nato Unclassified, (Oct. 4, 1993), pp. 2-1 to 2-8.

Primary Examiner—Sonny Trinh
Assistant Examiner—Huy Phan
(74) Attorney, Agent, or Firm—Sughrue Mion, PLLC

(57) ABSTRACT

In a multi-network environment, a request signal is sent from a user terminal to each of a number of communications networks. In response, the network returns a response signal. Based on the response signals received from all networks, the user selects one of the networks. The response signal contains information on communication services of the requested network such as tariff data and current congestion level. The user terminal then establishes a connection to the selected communications network. In a modified embodiment, request signals may be sent during a handover to base stations of different wireless networks to request for congestion information for selecting a network having the lowest congestion level as a handover destination. In a further modification, when a congestion is encountered in a first network in response to a user's request, a second network of low congestion level is selected and indicated to the user.

16 Claims, 5 Drawing Sheets

U.S. PATENT DOCUMENTS

| | | | |
|---|---|---|---|
| 6,470,184 B1 * | 10/2002 | Machida | 455/453 |
| 6,571,100 B1 * | 5/2003 | Lautenschlager | 455/445 |
| 6,591,103 B1 * | 7/2003 | Dunn et al. | 455/436 |
| 6,614,769 B1 * | 9/2003 | Erlick et al. | 370/331 |
| 6,771,964 B1 * | 8/2004 | Einola et al. | 455/437 |
| 2001/0009853 A1 * | 7/2001 | Arimitsu | 455/434 |
| 2002/0032034 A1 * | 3/2002 | Tiedemann et al. | 455/437 |
| 2002/0077107 A1 * | 6/2002 | Eng et al. | 455/445 |
| 2002/0082005 A1 * | 6/2002 | Ikeda et al. | 455/426 |
| 2002/0087674 A1 * | 7/2002 | Guilford et al. | 709/223 |
| 2002/0132622 A1 * | 9/2002 | Bender et al. | 455/442 |
| 2002/0160785 A1 * | 10/2002 | Ovesjo et al. | 455/453 |
| 2005/0037757 A1 * | 2/2005 | Moon et al. | 455/436 |

FOREIGN PATENT DOCUMENTS

| | | |
|---|---|---|
| EP | 0 808 073 A2 | 11/1997 |
| EP | 0 868 060 A1 | 9/1998 |
| JP | H09-69880 A | 3/1997 |
| JP | 2000-197134 A | 7/2000 |
| JP | 2000-278761 A | 10/2000 |
| WO | WO 96/28947 A1 | 9/1996 |
| WO | WO 99/48258 A1 | 9/1999 |

* cited by examiner

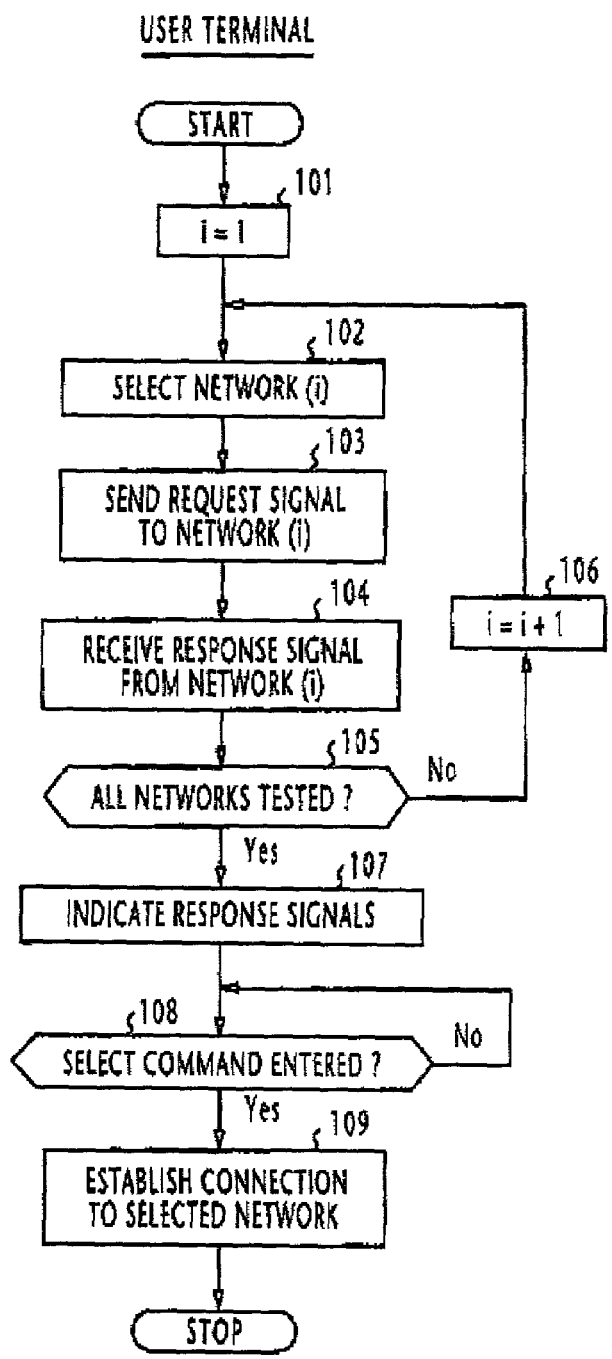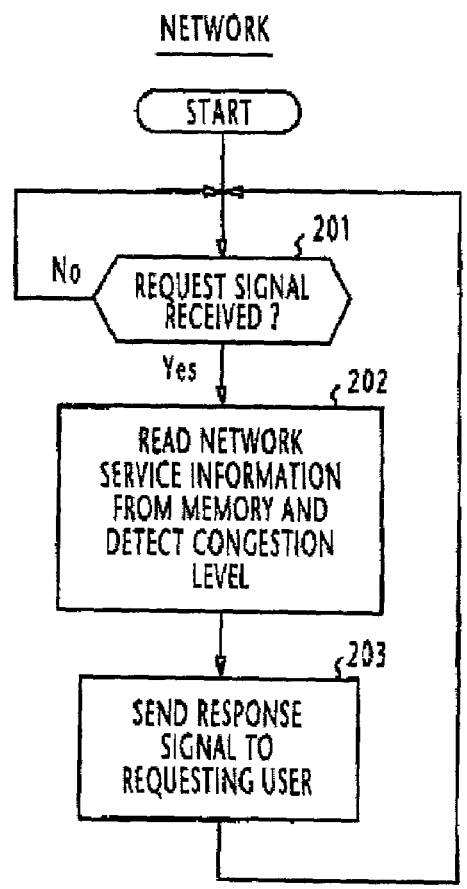

MULTI-NETWORK COMMUNICATIONS SYSTEM

BACKGROUND OF THE INVENTION

1. Field of the Invention

The present invention relates generally to communications networks and more specifically to a multi-network communication system in which the user can select one of a plurality of communications networks owned and operated by different service providers.

2. Description of the Related Art

There are a number of communications networks owned and operated by different service providers. Users compare the service features of the networks to select one that meets their desired feature and purchase a mobile terminal of the selected network. In a service area where networks of different service providers co-exist one network may be carrying heavy traffic while another is carrying light traffic with a sufficient remaining capacity to handle new calls. In such instances, it is desirable for users to access the light-traffic network. To meet this objective, a multi-network user terminal has been developed to allow the user to use a desired one of the networks the terminal can access. However, none of these networks sends back a response signal that indicates the current level of network traffic. Therefore, the user has to arbitrarily choose one network and makes a call attempt. If congestion is encountered, the user abandons the call and switches over to another network and repeats the same process. The process may be repeated until the user encounters a network that can complete the call.

Therefore, a need does exist to provide a multi-network environment that allows users to receive services from a number of communications networks without the need for making a manual switchover from one network to another.

SUMMARY OF THE INVENTION

It is therefore an object of the present invention to provide a multi-network communications system in which the user can access a desired network.

According to a first aspect, the present invention provides a method of establishing a connection to a desired communications network, comprising the steps of sending a request signal to each of a plurality of communications networks, receiving response signals from the networks, indicating the received response signals, allowing a user to select one of the networks based on the indicated response signals, and establishing a connection to the selected communications network.

According to a second aspect, the present invention provides a communication terminal comprising a network interface for sending a request signal to each of a plurality of communications networks and for receiving response signals from the networks, and a user interface for indicating the received response signals to allow a user to enter a command signal based on the indicated response signals and selecting one of the networks according to the entered command signal. The network interface establishes a connection to one of the networks which is selected by the user interface.

According to a third aspect, the present invention provides a communication system comprising a plurality of wireless networks and a user communication terminal. Each of the wireless networks produces a response signal upon receipt of a request signal. The user communication terminal comprises a wireless interface for sending request signals to the wireless networks and for receiving response signals from the networks. A user interface indicates the received response signals to allow the user to enter a command signal and selects one of the wireless networks according to the entered command signal. The wireless interface establishes a connection to one of the communications networks which is selected by the user interface.

According to a fourth aspect, the present invention provides a method of performing a handover operation, comprising the steps of sending a handover request signal to each of a plurality of wireless networks, receiving response signals from the wireless networks, the response signals indicating respective traffic congestion levels of the wireless networks, selecting one of the wireless networks based on the response signals received from the networks, and establishing a connection to the selected wireless network.

According to a fifth aspect, the present invention provides a mobile terminal comprising a wireless interface for sending a handover request signal to each of a plurality of wireless networks and receiving response signals from the wireless networks, the response signals indicating respective traffic congestion levels of the networks, and control circuitry for selecting one of the wireless networks based on the received response signals. The wireless interface establishes a connection to the wireless network selected by the control circuitry.

According to a sixth aspect, the present invention provides a communication system comprising a plurality of wireless networks, each of said networks producing a response signal upon receipt of a handover request signal which indicates traffic congestion level of the network, and a wireless terminal. The wireless terminal comprises a wireless interface for sending the handover request signal to the wireless networks and receiving the response signals from the wireless networks. Control circuitry selects one of the wireless networks based on the received response signals. The wireless interface establishes a connection to one of the wireless networks which is selected y the control circuitry.

According to a seventh aspect, the present invention provides a method of establishing a connection to a selected network. The method comprises the steps of receiving, at a first communications network, a connection request from a user terminal, sending a request signal from the first communications network to a traffic management center if the connection request encounters a traffic congestion, sending a rerouting message from the center to the user terminal via the first communications network for identifying a second communications network whose congestion level is lower than a predefined threshold level to thereby allow a user to send a connection request to the second communications network.

According to an eighth aspect, the present invention provides a communication system including a traffic management center, and a plurality of communications networks. A first one of the communications networks receives a connection request from a user terminal and sends a request signal to the traffic management center when a traffic congestion is encountered in the first communications network. The traffic management center responds to the request signal by sending a message to the requesting network identifying a second one of the networks whose congestion level is lower than a predetermined threshold level. The message sent from the center is retransmitted to the user terminal to allow the user to switch to the second communications network.

BRIEF DESCRIPTION OF THE DRAWINGS

The present invention will be described in detail further with reference to the following drawings, in which:

FIG. 2 is a flowchart of the operation of a user terminal according to a first embodiment of the present invention;

FIG. 3 is a flowchart of the operation of a communications network according to the first embodiment of this invention;

DETAILED DESCRIPTION

Figure 1:
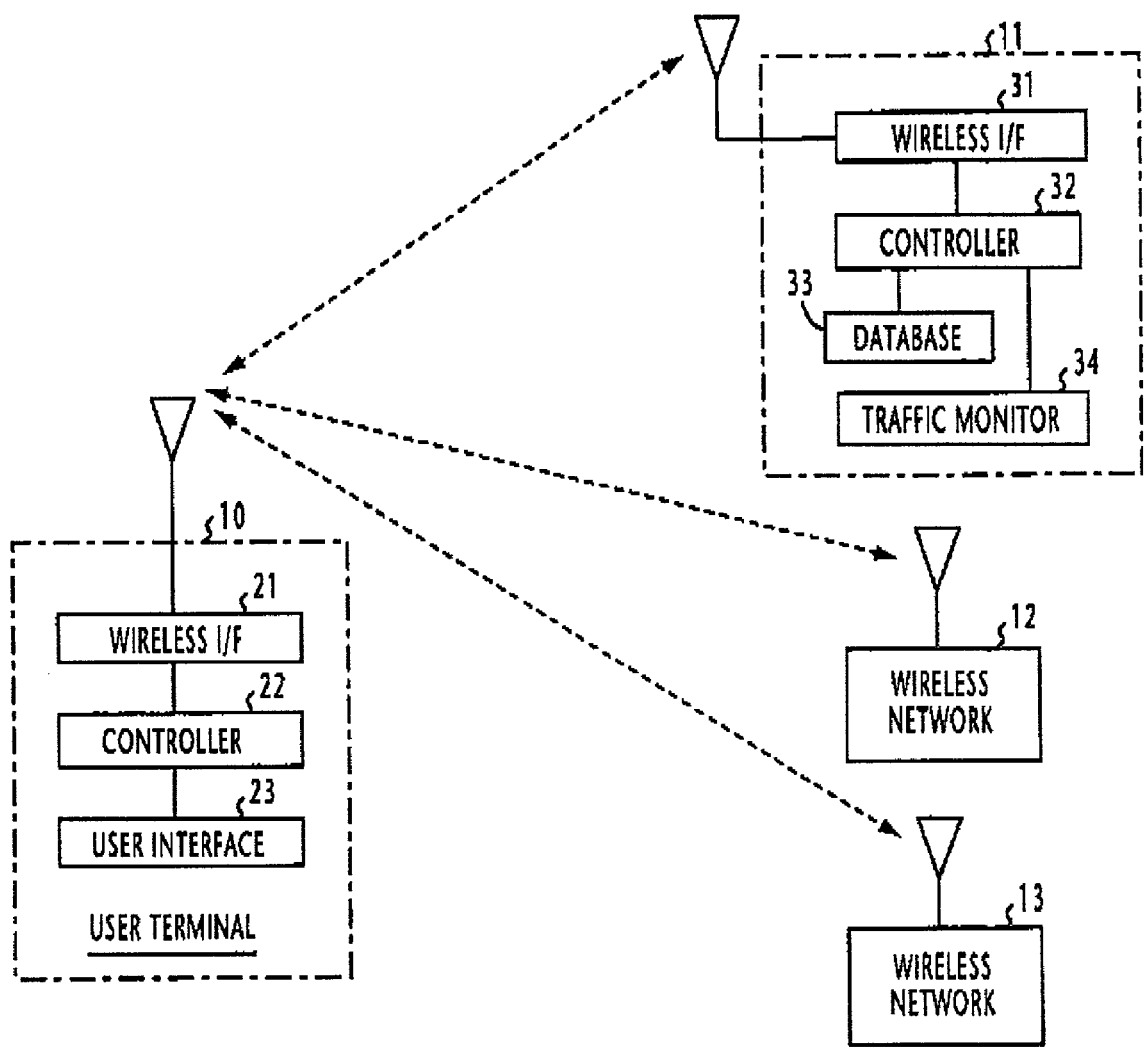
FIG. 1 is a block diagram of a multi-network communication system according to the present invention.

In FIG. 1, there is shown a user terminal 10 which can selectively access to a plurality of wireless communication networks 11, 12 and 13, which are respectively owned and operated by different service providers. User terminal 10 is either a mobile terminal of cellular phone network or a fixed terminal of a wireless network connected by a fixed wireless access (FWA) system, for example.

As will be described, the user at the terminal 10 selects a desired network according to response signals received from the wireless networks 11, 12 and 13. For this purpose, the user terminal 10 is essentially comprised of a wireless interface 21, a controller 22 and a user interface 23. Controller 22 directs the wireless interface 21 to send a request signal to and receive a response signal from each wireless network. User interface 23 includes a display and an annunciator for indicating the received response signal to permit the user to select a desired network and enter a command signal. Controller 22 directs the wireless interface 21 to establish a connection to the network which is selected by the user interface 23.

Each of the wireless networks is essentially comprised of a wireless interface 31, a controller 32, a memory or database 33 and a traffic monitor 34. Database 33 stores network service information such as tariff of the network. Traffic monitor 34 constantly monitors the network for detecting the traffic congestion level of the network. In response to a request signal from the user terminal 10, the controller 32 of an accessed wireless network reads tariff data from the database 33 and formulates a response signal with the tariff data and the congestion level detected by the traffic monitor 34 and transmits the response signal to the requesting user terminal 10.

These wireless networks have different tariffs and traffic handling capacities. For example, the wireless network 11 has lowest phone rate and lowest traffic handling capacity (i.e., highest congestion level), the wireless network 12 has medium phone rate and medium traffic handling capacity (i.e., medium congestion level), and the wireless network 13 has highest phone rate and highest traffic handling capacity (i.e., lowest congestion level).

According to a flowchart shown in FIG. 2, the operation of the controller 22 proceeds by initially setting a network identifying variable "i" to 1 at step 101. Controller 22 selects a network (i) at step 102 and sends a request signal to the selected network for requesting it to send a phone rate schedule of the network and the current traffic level (step 103).

In FIG. 3, the network identified by the variable "i" responds to the request signal (step 201) and reads the tariff data from the database 33 and causes the traffic monitor 34 to detect the current traffic level of the network (step 202) and formulates and sends a response signal to the requesting user to communicate the tariff and congestion data.

In FIG. 2, the user terminal receives the response signal at step 104. The response signal is converted by the controller 22 into a vocal announcement which is supplied to an annunciator or converted to textual data which is supplied to display unit (step 105). If all networks are not tested (step 106), the variable "i" is incremented by one at step 107. Steps 102 to 105 are repeated on the next wireless network until requested information are obtained from all networks.

If all networks have been tested, flow proceeds from step 106 to step 108 to prompt the user to enter a command signal for selecting one of the communications networks. When a select command is entered from the user interface 23 at step 109, the controller 22 directs the wireless interface 21 to establish a connection to the selected network (step 110).

The present invention can be advantageously used to perform a handover when communication signals transmitted from the user terminal 10 fall below a critical level during a call.

Figure 4:
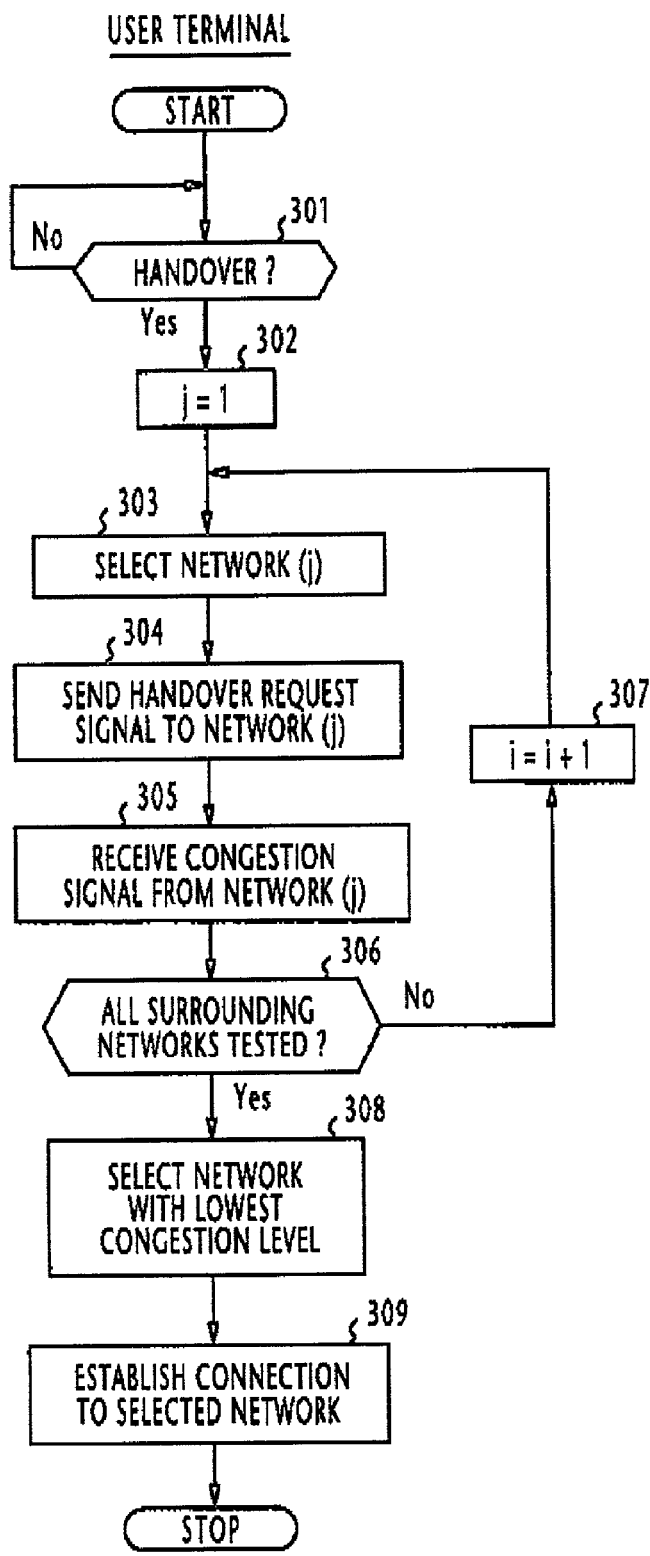
FIG. 4 is a flowchart of the operation of a user terminal according to a second embodiment of the present invention.

FIG. 4 is a flowchart of the operation of the user terminal 10 when the communicating wireless network is performing a handover. When the mobile terminal detects that a handover operation is in progress (step 301), a variable "j" is incremented by 1 at step 302. Variable "j" identifies a wireless network other than the network with which the mobile terminal is currently in communication. Mobile terminal 10 selects a base station of the wireless network (j) at step 303 and sends a handover request signal to the selected network (step 304).

Figure 5:
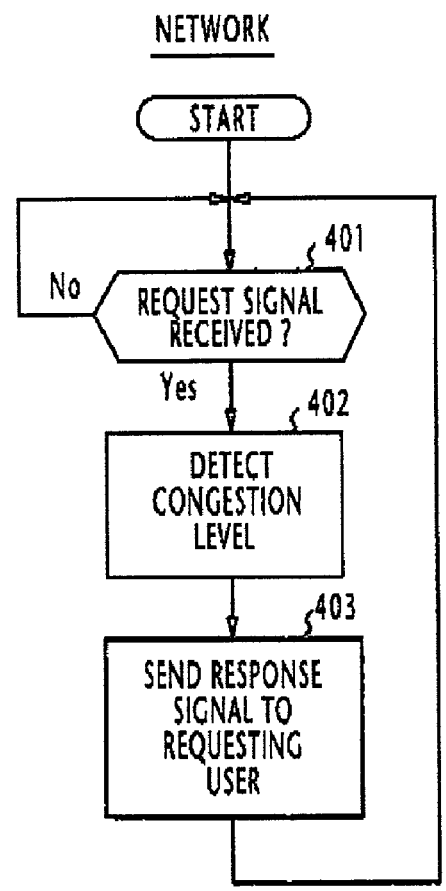
FIG. 5 is a flowchart of the operation of a wireless network according to the second embodiment of this invention.

In FIG. 5, the network identified by the variable "j" responds to the handover request signal (step 401) and detects the current traffic level of the network with its traffic monitor (step 402) and sends a response signal to the requesting user to inform the detected congestion level (step 403).

In FIG. 4, the requesting user terminal receives the congestion level indicating signal from the selected network (step 305). Steps 303 to 305 are repeated on surrounding base stations of other wireless networks by incrementing the variable "j" by one at step 307 until all surrounding base stations have been tested (step 306).

At step 308, the user terminal selects one of the wireless networks whose congestion level is of the lowest value and establishes a handover connection to the base station of the selected wireless network (step 309).

Figure 6:
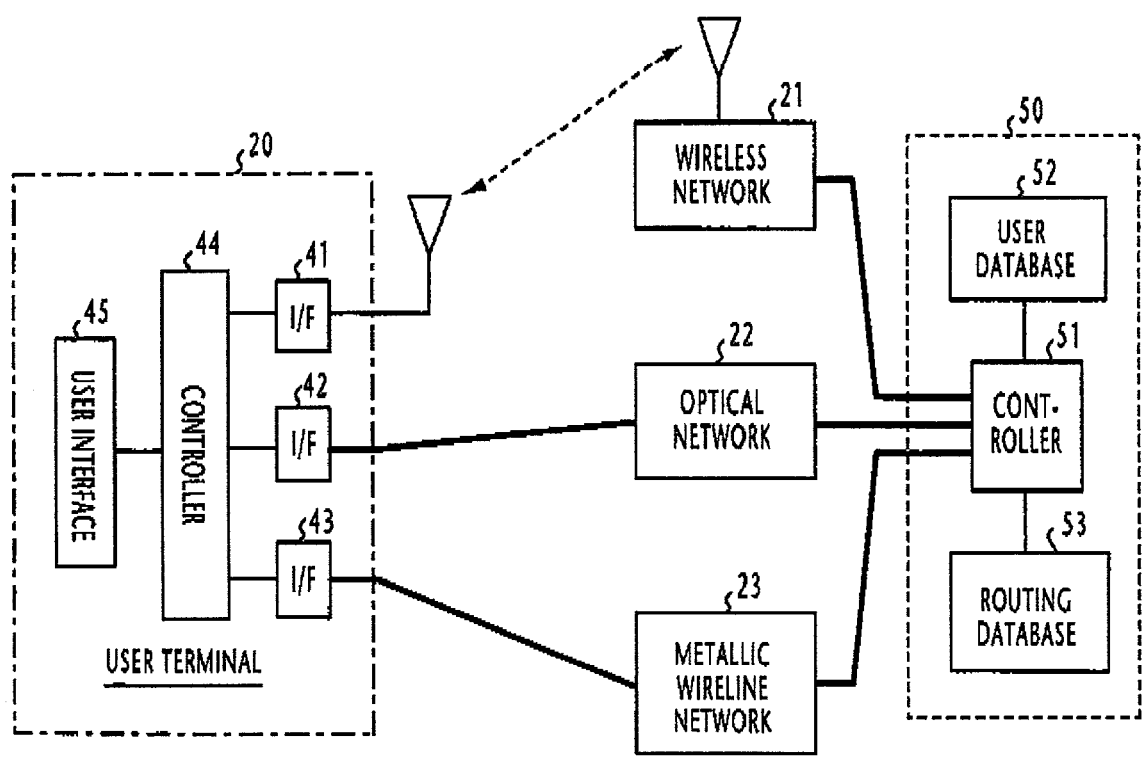
FIG. 6 is a block diagram of a second embodiment of the multi-network communication system of the present invention.

The present invention can also be implemented in a different configuration as shown in FIG. 6 in which a user terminal 20 can operate in multiple modes. In a mobile mode, the user terminal is served by a wireless network 21 and in a fixed mode it is served by an optical network 22 or a metallic wireline (copper or coaxial) network 23. User terminal 20 is essentially comprised of a wireless interface 41, an optical line interface 42 and a wireline interface 43 for establishing a connection to the wireless network 21, the optical network 22 and the wireline network 23, respectively. A controller 44 is provided between the interfaces 41, 42, 43 and a user interface 45.

A traffic management center 50 is provided, which includes a user-information database 52, a routing database 53 and a controller 51 connected to both databases. Networks 21, 22 and 23 are also connected to the controller 51. The information stored in the database 52 identifies networks to which registered users are accessible. Routing database 53 maintains cost data indicating the cost of a call routed through each of the networks 21, 22, 23 to a particular destination. Controller 51 monitors networks 21, 22 and 23 to detect their congestion levels. If a request signal is received from a user terminal via one of the networks the controller 51 reads the information of the requesting user from the database 52 and determines whether the user is accessible to other networks. If this is the case, the controller 51 returns a response signal to the user terminal to indicate another network as an alternate route if the congestion level of the current network exceeds some threshold level.

In operation, the user initially selects one of the communications networks 21, 22 and 23. If the selected network is the wireless network 21, the user establishes a wireless link via wireless interface 41 to a base station by manipulating the operating keys of the user terminal. If the initially selected network is one of networks 22 and 23, the user attaches the user terminal 20 to the line terminal of the selected network through the corresponding line interface 42 or 43 and establishes a connection to the selected network. Such line terminals may be provided in a public telephone booth or an office environment in which users can access a number of different networks via a private branch exchange.

Figure 7:
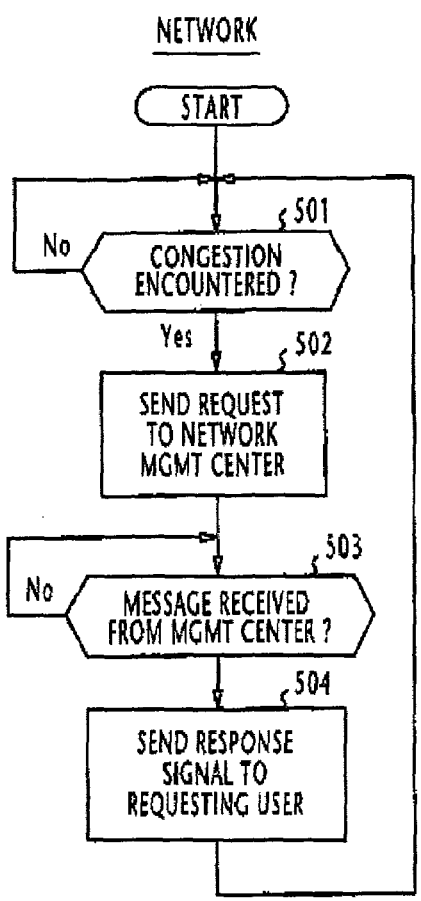
FIG. 7 is a flowchart of the operation of a communication network according to the second embodiment of the present invention.
Figure 8:
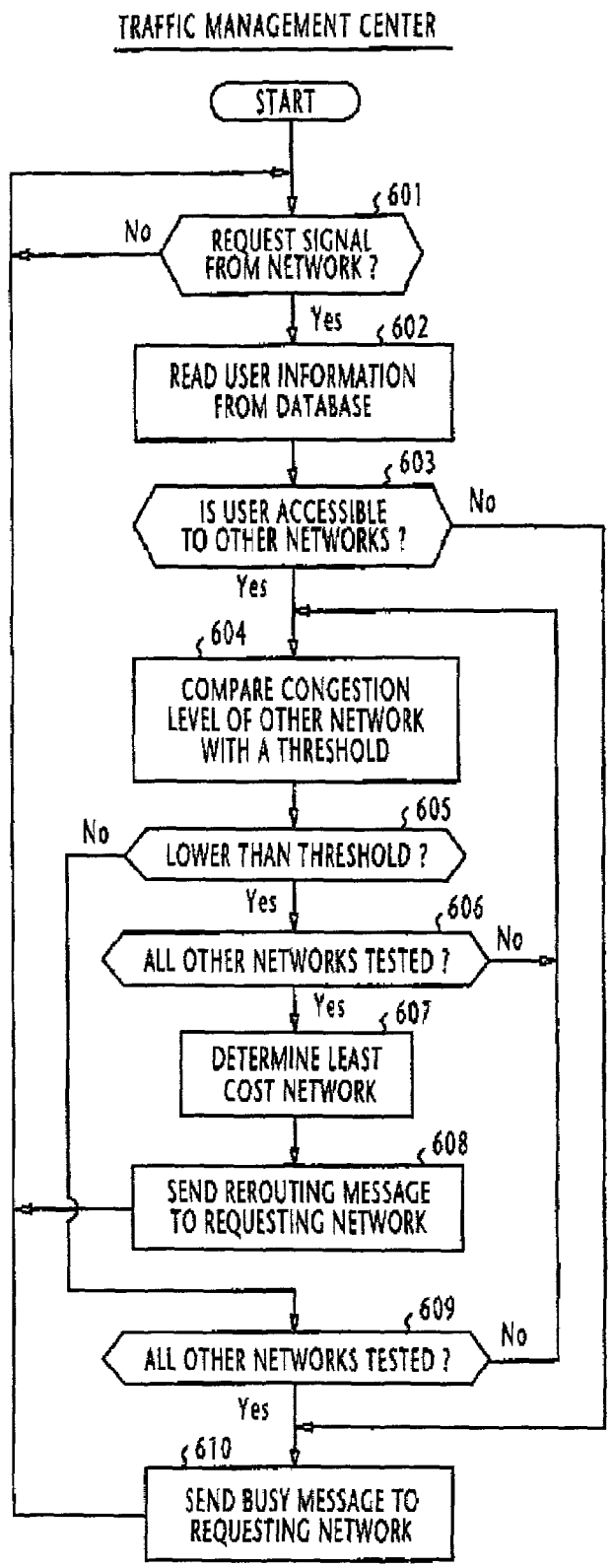
FIG. 8 is a flowchart of the operation of a traffic management center according to the second embodiment.

The operation of each of the networks 21, 22 and 23 proceeds according to the flowchart of FIG. 7 and the operation of the traffic management center 50 proceeds according to the flowchart of FIG. 8.

If a user encounters a congestion in the initially selected network (step 501), the selected network sends a request signal to the traffic management center 50 (step 502). When the controller 51 of management center receives the request signal from one of the networks 21, 22, 23 (step 601), it reads user information from the database 52 (step 602) to determine whether the user is entitled to access other networks (step 603). If the user is not entitled to access other networks, flow proceeds from step 603 to step 610 to send a busy message to the requesting network, and returns to the starting point of the routine. If the decision at step 603 is affirmative, flow proceeds to step 604 to compare the congestion levels of other networks with a predefined threshold level and determines if the congestion level of a network is lower than the threshold level (step 605), If this is the case, flow proceeds from step 605 to step 606 to check to see if all other networks have been tested. If not, flow returns to step 604 to repeat the comparison step on the next network. If all other networks have been tested, flow proceeds to step 607 to determine the network having a least routing cost, and the controller 51 sends a rerouting message to the requesting network (step 608). If the congestion levels of all other networks are higher than the threshold, flow proceeds through steps 605 and 609 to step 610 to send a busy message to the requesting network, When the requesting network receives a rerouting message or a busy message from the traffic management center 50 (step 503), it retransmits the receive message to the requesting user as a response signal (step 504) and returns to the starting point of the routine.

When the user receives a response signal from the initially selected network, the user terminal 20 may be switched to another interface for re-establishing a connection.

What is claimed is:

1. A method of establishing a connection to a desired communications network, comprising the steps of:
    sending a request signal to each of a plurality of communications networks;
    receiving response signals from said communications networks;
    indicating the received response signals;
    allowing a user to select one of said plurality of networks based on the indicated response signals; and
    establishing a connection to the selected communications network, wherein said response signals indicate the traffic congestion level for each of said plurality of communications networks.

2. The method of claim 1, wherein said response signal indicates information concerning a communication service of each of said communications networks.

3. The method of claim 2, wherein said information indicates tariff of each of said communications networks.

4. A communication terminal comprising:
    a network interface for sending a request signal to each of a plurality of communications networks and for receiving response signals from said communications networks; and
    a user interface for indicating the received response signals to allow a user to enter a command signal based on the indicated response signals and selecting one of said plurality of networks according to the entered command signal; and
    said network interface establishing a connection to one of said plurality of networks which is selected by said user interface, wherein said response signals indicate the traffic congestion level for each of said plurality of communications networks.

5. The communication terminal of claim 4, wherein said response signal indicates information concerning a communication service of each of said communications networks.

6. The communication terminal of claim 5, wherein said information indicates tariff of each of said communications networks.

7. A communication system comprising:
    a plurality of wireless networks, each of the wireless networks producing a response signal upon receipt of a request signal; and
    a wireless terminal comprising:
    a wireless interface for sending said request signal to each of said plurality of wireless networks and for receiving response signals from said wireless networks;
    a user interface for indicating the received response signals, allowing a user to enter a command signal based on the indicated response signals and selecting one of said wireless networks according to the entered command signal,
    said wireless interface establishing a connection to one of said wireless networks which is selected by said user interface, wherein said response signals indicate the traffic congestion level for each of said plurality of communications networks.

8. The communication system of claim 7, wherein said response signal indicates information concerning a communication service of each of said communications networks.

9. The communication system of claim 8, wherein said information indicates tariff of each of said networks.

10. A method of performing a handover operation by a mobile terminal, comprising the steps of:
- said mobile terminal sending a handover request signal to each of a plurality of wireless networks;
- said mobile terminal receiving a response signal from each of said plurality of wireless networks, the response signal of each wireless network indicating traffic congestion level of the network;
- said mobile terminal selecting one of said plurality of wireless networks based on the traffic congestion level included in the response signals received from said wireless networks; and
- said mobile terminal establishing a connection to the selected wireless network.

11. A mobile terminal comprising:
- a wireless interface for sending a handover request signal to each of a plurality of wireless networks and receiving a response signal from each of said plurality of wireless networks, the response signal of each wireless network indicating traffic congestion level of the network; and
- control circuitry for selecting one of said plurality of wireless networks based on the traffic congestion level included in the response signals received from said networks,
- said wireless interface establishing a connection to the wireless network selected by the control circuitry.

12. A communication system comprising:
- a plurality of wireless networks, each of said networks producing a response signal upon receipt of a handover request signal which indicates traffic congestion level of the network; and
- a wireless terminal comprising:
  - a wireless interface for sending said handover request signal to said wireless networks and receiving said response signals from said wireless networks; and
  - control circuitry for selecting one of said wireless networks based on the traffic congestion level included in the received response signals,
  - said wireless interface establishing a connection to one of said wireless networks which is selected by said control circuitry.

13. A method of establishing a connection to a selected network, comprising the steps of:
- receiving, at a first communications network, a connection request from a mobile terminal;
- sending a request signal from said first communications network to a traffic management center if said connection request encounters a traffic congestion; and
- sending a rerouting message from the center to said mobile terminal via said first communications network for identifying a second communications network whose congestion level is lower than a predefined threshold level to thereby allow a user of said mobile terminal to send a connection request to said second communications network.

14. The method of claim 13, wherein said second communications network has a least routing cost.

15. A communication system comprising:
- a traffic management center; and
- a plurality of communications networks, a first one of the communications networks receiving a connection request from a mobile terminal and sending a request signal to said traffic management center when a traffic congestion is encountered in said first communications network and receiving a rerouting message from said center, and sending the received rerouting message to said mobile terminal to allow a user of said mobile terminal to establish a connection to a network identified by the rerouting message,
- said traffic management center responding to said request signal by returning said rerouting message to said first communications network, the rerouting message identifying a second one of said networks whose congestion level is lower than a predefined threshold level.

16. The communication system of claim 15, wherein said second one of the networks has a least routing cost.

* * * * *